(12) United States Patent
BenHanokh et al.

(10) Patent No.: US 11,860,788 B2
(45) Date of Patent: Jan. 2, 2024

(54) PREFETCHING DATA IN A DISTRIBUTED STORAGE SYSTEM

(71) Applicant: RED HAT, INC., Raleigh, NC (US)

(72) Inventors: Gabriel Zvi BenHanokh, Tel-Aviv (IL); Yehoshua Salomon, Kfar Saba (IL)

(73) Assignee: Red Hat, Inc., Raleigh, NC (US)

( * ) Notice: Subject to any disclaimer, the term of this patent is extended or adjusted under 35 U.S.C. 154(b) by 68 days.

(21) Appl. No.: 17/468,954

(22) Filed: Sep. 8, 2021

(65) Prior Publication Data
US 2023/0071111 A1    Mar. 9, 2023

(51) Int. Cl.
*G06F 12/0862*    (2016.01)
*G06F 3/06*    (2006.01)

(52) U.S. Cl.
CPC .......... *G06F 12/0862* (2013.01); *G06F 3/061* (2013.01); *G06F 3/0659* (2013.01); *G06F 3/0679* (2013.01); *G06F 2212/602* (2013.01)

(58) Field of Classification Search
CPC ....................................................... G06F 3/06
See application file for complete search history.

(56) References Cited

U.S. PATENT DOCUMENTS

| | | | |
|---|---|---|---|
| 6,157,963 A * | 12/2000 | Courtright, II | G06F 3/061 710/5 |
| 8,589,655 B2 | 11/2013 | Colgrove et al. | |
| 8,732,342 B1 | 5/2014 | Clark et al. | |
| 9,436,391 B1 * | 9/2016 | Lewis | G06F 3/0613 |
| 9,792,051 B2 | 10/2017 | Liu et al. | |
| 10,313,219 B1 * | 6/2019 | Burcham | H04W 24/08 |
| 2004/0202165 A1 * | 10/2004 | Aoki | G06F 9/546 709/236 |
| 2005/0144394 A1 * | 6/2005 | Komarla | G06F 12/0862 711/137 |
| 2015/0283456 A1 * | 10/2015 | Chan | A63F 13/30 463/43 |
| 2018/0115791 A1 * | 4/2018 | Resch | H04L 65/612 |
| 2018/0150125 A1 * | 5/2018 | HomChaudhuri | G06F 12/123 |
| 2019/0243683 A1 * | 8/2019 | Botelho | G06F 21/44 |
| 2020/0050505 A1 * | 2/2020 | Guo | G11C 29/52 |

OTHER PUBLICATIONS

Herbein, S., et al., "Scalable I/O-Aware Job Scheduling for Burst Buffer Enabled HPC Clusters," HPDC, 2016, https://flux-framework.org/publications/Flux-HPDC-2016.pdf.
"I/O Schedulers," 2016, https://androidmodguide.blogspot.com/p/io-schedulers.html.
"I/O schedulers Documentation," IBM, 2016, https://www.IBM.com/docs/en/linux-on-systems?topic=linuxonibm/performance/tuneforsybase/ioschedulers.htm.

* cited by examiner

*Primary Examiner* — William E. Baughman
(74) *Attorney, Agent, or Firm* — Kilpatrick Townsend & Stockton LLP

(57) ABSTRACT

Data can be prefetched in a distributed storage system. For example, a computing device can receive a message with metadata associated with at least one request for an input/output operation from a message queue. The computing device can determine, based on the message from the message queue, an additional IO operation predicted to be requested by a client subsequent to the at least one request for the IO operation. The computing device can send a notification to a storage node of a plurality of storage nodes associated with the additional IO operation for prefetching data of the additional IO operation prior to the client requesting the additional IO operation.

20 Claims, 3 Drawing Sheets

PREFETCHING DATA IN A DISTRIBUTED STORAGE SYSTEM

TECHNICAL FIELD

The present disclosure relates generally to electronic data storage management. More specifically, but not by way of limitation, this disclosure relates to prefetching data in a distributed storage system.

BACKGROUND

Cloud computing systems provide on-demand access to a shared pool of computing resources, such as computing power and data storage. Some cloud computing systems include distributed storage systems for synchronizing, coordinating, and storing data. Such distributed storage systems include storage nodes that can work together so that the distributed storage system behaves as one storage system. Distributed storage systems can provide improvements to scalability, redundancy, and performance. For example, distributed storage systems can be easily scaled horizontally to include more or fewer storage nodes depending on demand. Distributed storage systems can also store multiple copies ("replicas") of the same data for high availability, backup, and disaster recovery purposes.

Distributed storage systems can implement file storage, block storage, or object storage protocols. File storage involves a hierarchical structure in which data is organized and represented as a hierarchy of files in folders. Block storage involves chunking data into arbitrarily organized, evenly sized units of data called "blocks." Each block has a unique identifier for allowing it to be placed wherever is most convenient in the distributed storage system. Object storage involves a two-level hierarchical structure in which data is stored in discrete units called "objects," which may be kept in single-level (non-hierarchical) repositories called "buckets". The low cost and scalability of object storage has made it prevalent in public cloud storage systems.

DETAILED DESCRIPTION

Figure 1:
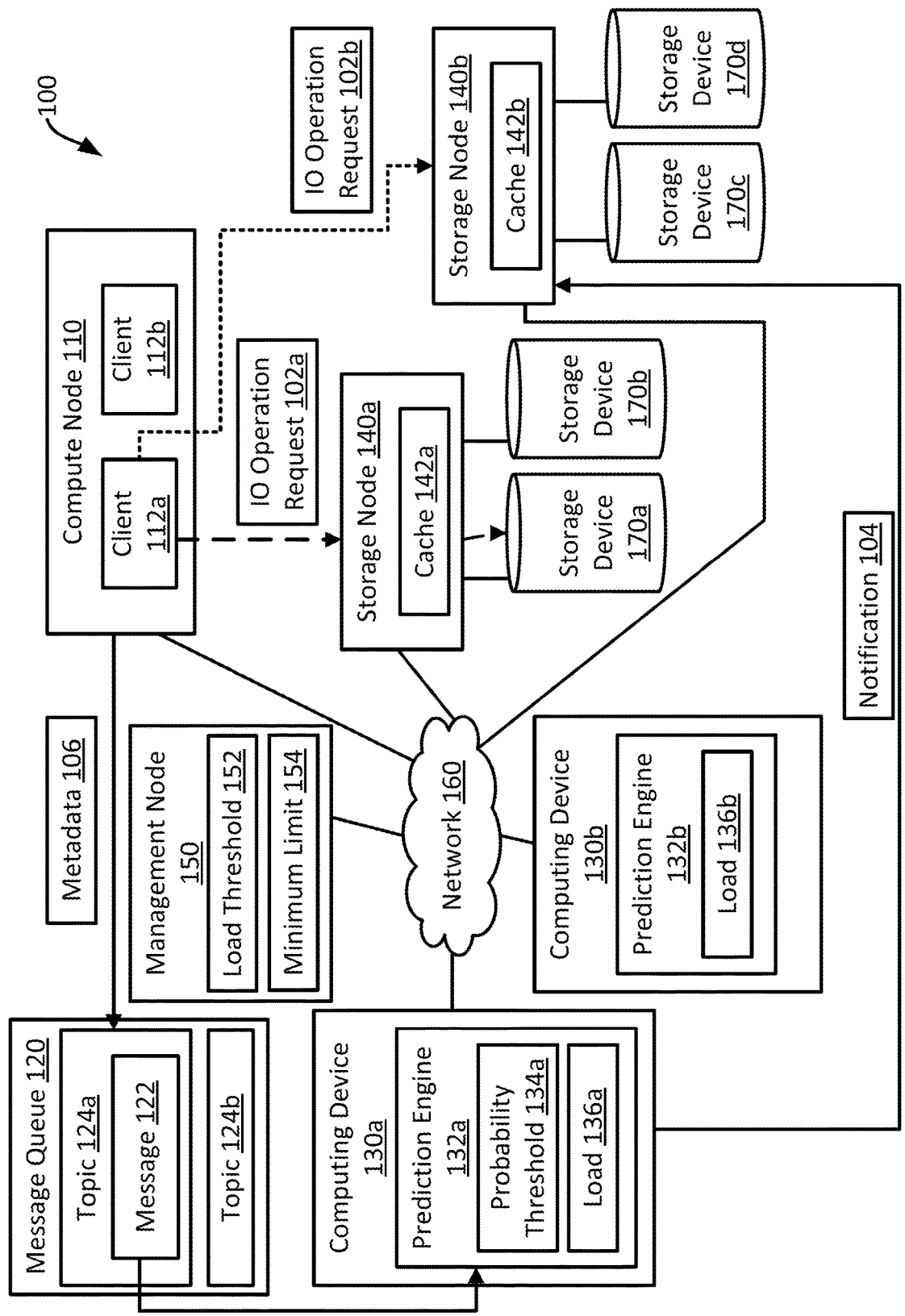
FIG. 1 is a block diagram of an example of a distributed storage system for implementing data prefetching according to some aspects of the present disclosure.

Storage nodes in a distributed storage system can include a cache of data and one or more storage devices of additional data. Data in the cache may be more quickly and easily accessible, such that a request from a client for data in the cache may be serviced more quickly than data in a storage device. Thus, it may be beneficial for the distributed storage system to predict data that will be requested by a client so that the storage node can store data in the cache prior to the data being requested by the client. To implement such a prediction system, the prediction system gathers information about input/output (IO) patterns from clients simultaneously, which is complex in a distributed storage system without a central component that logs the IO patterns to the system. Rather, each storage node works against the other components independently and does not have information about the load on other nodes. As a result, predictions in a distributed storage system may not be possible, or may be inaccurate if determined.

Some examples of the present disclosure can overcome one or more of the abovementioned problems by prefetching data before requests are received for the data in a distributed storage system. For example, the distributed storage system can include a client, storage nodes, and a computing device. The distributed storage system can also include an asynchronous message passing mechanism, such as a message queue. Each of the storage nodes can lack load information for other storage nodes. The client can send at least one request for an IO operation. The message queue can receive metadata associated with the at least one request as a message. The computing device can receive the message(s) from the message queue and determine an additional IO operation predicted to be requested by the client subsequent to the at least one request for the IO operation. The computing device can then send a notification to a storage node that is associated with the additional IO operation for prefetching data of the additional IO operation prior to the client requesting the additional IO operation. The storage node can retrieve the data from a storage device and store the data in a cache of the storage node prior to receiving the request for the additional IO operation from the client. This may significantly reduce read IO latency in the distributed storage system.

As a more specific example, a computing device can receive a message indicating a read request from a client for reading data A from a hard disk of storage node A. The computing device can determine data B, stored on storage node B, has historically been requested by the client after a read request for the data A. The computing device can send a notification to storage node B indicating data B is likely to be read. Storage node B can obtain the data B from the hard disk and store the data B in the cache prior to receiving the request for data B. This may aid in reducing latency when storage node B receives a subsequent request for data B.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a distributed storage system 100 for implementing data prefetching according to some aspects of the present disclosure. The distributed storage system 100 can include a compute node 110. Examples of the client compute node 110 can include a laptop computer, desktop computer, server, mobile phone, etc. The distributed storage system 100 can additionally include a message queue 120, computing devices 130*a-b*, storage nodes 140*a-b*, a management node 150, and storage devices 170*a-d*. Examples of the storage devices 170*a-d* can include hard disk drives, solid state drives, magnetoresistive random access memory (MRAM) drives, external just a bunch of disks (JBOD) systems, or any other internal or external device capable of storing data. Although not shown in FIG. 1, the message queue 120 may be in a memory device, such as a dynamic random access memory (DRAM). As shown in FIG. 1, some or all of these components can communicate with one another via a network 160, such as a local area network (LAN) or the Internet. Each of the storage nodes 140*a-b* can include one or more of the storage devices 170a-d, which can be accessible by each of the clients 112a-b. Each of the storage nodes 140a-b can lack load information for the other storage nodes in the distributed storage system 100.

Clients 112a-b can run on the client compute node 110. The clients 112a-b may be software applications using a particular type of storage, such as a block, file, or object. The clients 112a-b can communicate with other components of the distributed storage system 100 via a dedicated driver. For example, if the client 112a is a software application that uses a block volume, there can be a block driver that converts IO operations for the client 112a into messages that can be routed to a correct storage node for performing the IO operation. The drivers of the clients 112a-b can also send messages about the IO operations to one or more message queues, for example the message queue 120. The messages can include metadata 106 associated with the IO operations. The message queue 120 can store the metadata 106 as a message 122. Alternatively, the message queue 120 may immediately forward the message 122 to a computing device. Sending the metadata 106 to the message queue 120 can occur in parallel and asynchronous to sending requests for operations to storage nodes. The message queue 120 may include multiple topics 124a-b, and each topic can receive messages from a particular client. For example, the topic 124a can receive messages from the client 112a and the topic 112b can receive messages from the client 112b. Alternatively, the distributed storage system 100 may include multiple message queues. Each of the multiple message queues can include one or more topics that each are associated with a particular client.

In some examples, a computing device can receive the message(s) from a particular message queue. The computing device can include a prediction engine for determining data that is to be prefetched based on the message(s) in the message queue. If the distributed storage system 100 includes multiple message queues that each store messages, the messages in a message queue can be processed by a single computing device so that the computing device can make accurate determinations about data to prefetch. For example, the computing device 130a can receive the message 122 of the metadata 106 associated with requests for IO operations from the client 112a. The computing device 130a can process the message 122 to determine a storage node that is likely to receive a subsequent IO operation from the client 112a based on the message 122. For example, at a first point in time, the client 112a may send an IO operation request 102a for data stored on the storage device 170a, associated with the storage node 140a. Based on the metadata 106 for the IO operation request 102a that is processed by the prediction engine 132a as part of the message 122, the computing device 130a can determine that the storage node 140b is likely to receive an IO operation request 102b from the client 112a at a subsequent point in time for data that is stored in the storage device 170c. The IO operation request 102b can be a read request that is sent by the client 112a immediately subsequent to the IO operation request 102a.

In some examples, the prediction engine 132a can use a historical pattern of requests for IO operations to determine that data stored in a disk storage device associated with the storage node 140b is to be prefeteched. For example, the prediction engine 132a can analyze stored information indicating a historical pattern of requests for IO operations from the client 112a. Based on this analysis, the prediction engine 132a can determine that the client 112a has historically followed a an IO operation request 102a for the data in the storage device 170a with another IO operation request for the data stored in the storage device 170c associated with the storage node 140b multiple times in the past. The prediction engine 132a may additionally or alternatively determine a series of predictions of data to be read. For example, the prediction engine 132a may predict that first data is predicted to be requested next and second data is predicted to be requested subsequent to the first data. In some examples, the prediction engine 132a can determine multiple possible data objects that may be requested. For example, the prediction engine 132a may determine that the client 112a has historically followed a an IO operation request 102a for the data in the storage device 170a with an IO operation request for data stored in the storage device 170c or an IO operation for data stored in the storage device 170d.

The prediction engine 132a may analyze the stored information using a machine-learning model (e.g., a deep neural network) or using any other suitable technique to identify this historical pattern. The machine-learning model can receive the metadata 106 of the message 122 as input. Based on this historical pattern, the prediction engine 132a can determine that data is to be prefetched based on the message 122 for the IO operation request 102a being received from the client 112a. The prefetching may involve reading the data. In some examples the prediction engine 132a may also determine a probability indicating a likelihood of the client 112a sending the IO operation request 102b subsequent to the IO operation request 102a. For example, the prediction engine 132a can determine a probability of 80%, indicating that the probability of the client 112a sending the IO operation request 102b is 80%.

In some examples, the prediction engine 132a can send a notification 104 to the storage node 140b indicating that data in the storage device 170c is to be read. In response, the storage node 140b can obtain the data from the storage device 170c, store the data in a cache 142b, and provide the data back to client 112a for subsequent use in reply to subsequently receiving the IO operation request 102b for the data. Prior to sending the notification 104, the prediction engine 132a may determine whether the probability of the client 112a sending the IO operation request 102b exceeds a probability threshold 134a. If the probability exceeds the probability threshold 134a, the prediction engine 132a can send the notification 104 to the storage node 140b. If the prediction engine 132a determines that the probability is less than the probability threshold 134a, the prediction engine 132a may not send the notification 104 to the storage node 140b. This can ensure that only data for predictions with a likelihood above a predefined probability are considered for prefetching, resulting in a smaller load on the distributed storage system 100 than if data is considered for prefetching for each prediction.

In some examples, the probability threshold 134a may be adjusted based on a load of the distributed storage system 100. For example, as the distributed storage system is more loaded, the probability threshold 134a can be higher. Additionally, when the distributed storage system 100 is less loaded, the probability threshold 134a can be lower such that data for lower certainty predictions can be prefetched without impacting the performance of the distributed storage system 100 for non-predicted IO operations.

Additionally or alternatively, each of the storage nodes 140a-b can decide whether to prefetch data based on the load on the storage node. For example, as the storage node 140a is more loaded, a probability threshold for prefetching data of the notification 104 can be higher. The probability may additionally inform a priority of the prefetching for different clients. For example, the storage node 140a may receive a first notification for prefetching data from the storage device 170a for the client 112a with a probability of 80% and a second notification for prefetching data from the storage device 170a for the client 112b with a probability of 40%. The storage node 140a can determine that the data of the first notification is to be served first based on the higher probability. The management node 150 may also monitor the loads 136a-b associated with each of the computing devices 130a-b to determine whether additional computing devices should be generated. For example, the distributed storage system 100 may only include the computing device 130a for predicting data to prefetch for the clients 112a-b in the distributed storage system 100. The management node 150 can determine that the load 136a associated with the computing device 130a exceeds a load threshold 152 and generate the computing device 130b with a prediction engine 132b for servicing a portion of the load. For example, the computing device 130b can receive messages from a message queue associated with the client 112b, while the computing device 130a receives messages from a message queue associated with the client 112a. Alternatively, if the load associated with a computing device is below a minimum limit 154, the computing device can be disabled. For example, the distributed storage system 100 can include the computing devices 130a-b. The management node 150 can determine that the load 136b associated with the computing device 130b is below the minimum limit 154. The management node 150 can determine that if the load 136b is added to the load 136a, the sum is less than the load threshold 152. The management node 150 can then disable the computing device 130b and the computing device 130a can take over receiving the messages from the message queue(s) that the computing device 130b was receiving.

In addition to a number of computing devices being adjustable, a number of message queues or topics included in a message queue may also be adjustable based on a load of each message queue. For example, if a number of clients associated with a message queue exceeds a threshold, an additional message queue can be generated. The threshold can be based on a number of topics the message queue includes, since each topic can serve one client. As the number of computing devices, topics, or message queues changes, the message queue associated with a client or a computing device associated with a message queue may also change. If the metadata 106 is sent to a message queue that is not serving the client 112a anymore, a response can be sent suggesting to the client 112a to reload the information from the management node 150 about which message queue 120 is serving the client 112a.

While the example shown in FIG. 1 depicts a specific number and arrangement of components for simplicity, other examples may include more components, fewer components, different components, or a different arrangement of the components shown in FIG. 1. For instance, although FIG. 1 shows one compute node, one message queue, two computing devices, two storage nodes, and four storage devices, other examples may include a smaller or larger number of each of these components. Additionally, while the example of FIG. 1 describes message queues as receiving and sending messages, other examples may involve any suitable asynchronous message passing mechanism.

Figure 2:
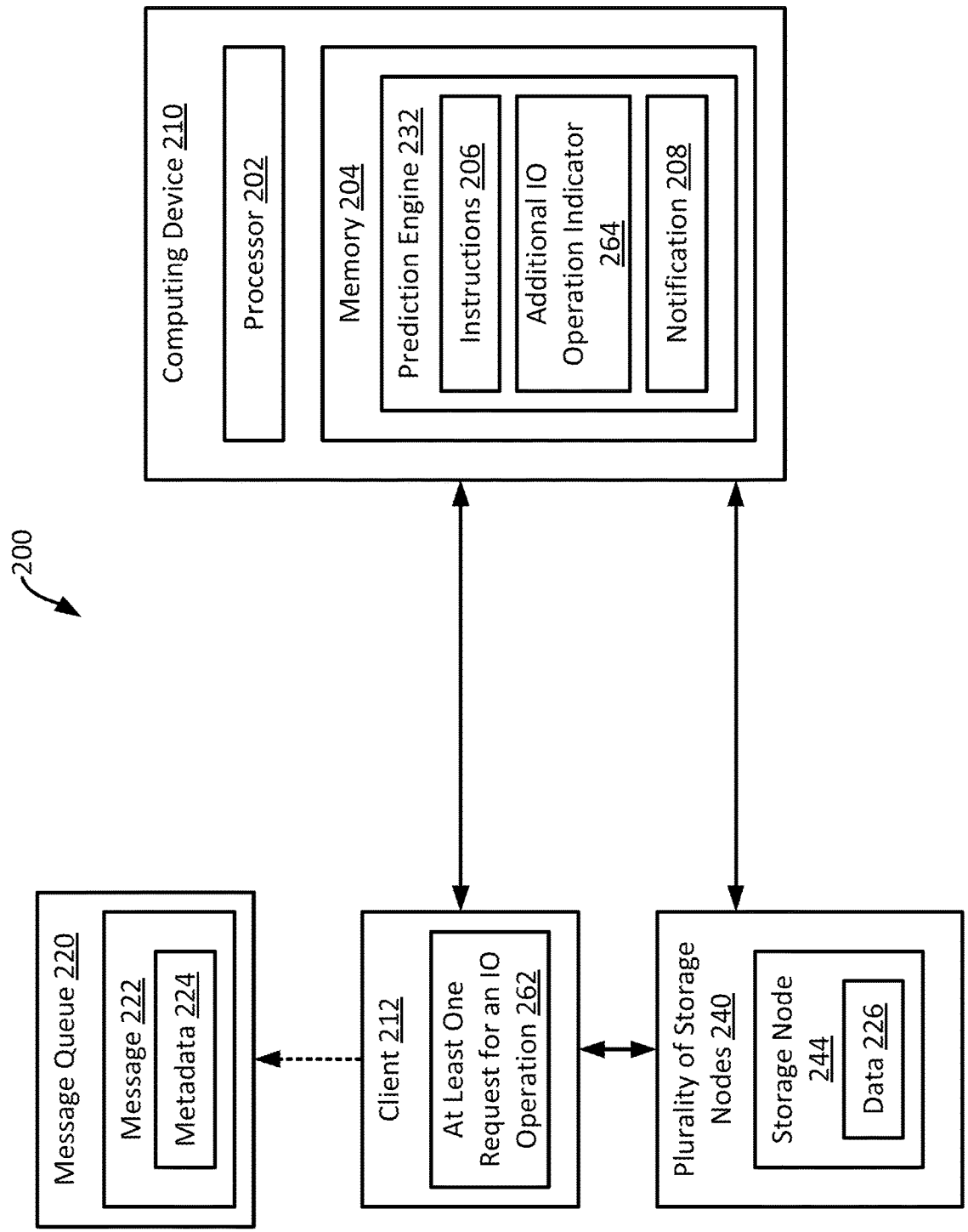
FIG. 2 is a block diagram of another example of a distributed storage system for implementing data prefetching according to some aspects of the present disclosure.

FIG. 2 is a block diagram of another example of a distributed storage system 200 for implementing data prefetching according to some aspects of the present disclosure. The distributed storage system 200 includes a computing device 210 with a processor 202 communicatively coupled with a memory 204. In some examples, the processor 202 and the memory 204 can be part of the same computing device, such as the computing device 130a of FIG. 1. In other examples, the processor 202 and the memory 204 can be distributed from (e.g., remote to) one another. The computing device 210 is communicatively coupled to a message queue 220 and a plurality of storage nodes 240. The message queue 220 is also communicatively coupled to a client 212. The client 212 can send at least one request for an IO operation 262. The client 212 can also send metadata 224 associated with the at least one request for the IO operation 262 as a message 222, which can be received by the message queue 220. The metadata 224 can be sent in parallel and asynchronous to the at least one request for an IO operation 262. Each storage node of the plurality of storage nodes 240 can lack load information for other storage nodes of the plurality of storage nodes 240.

The processor 202 can include one processor or multiple processors. Non-limiting examples of the processor 202 include a Field-Programmable Gate Array (FPGA), an application-specific integrated circuit (ASIC), a microprocessor, etc. The processor 202 can store a prediction engine 232 as instructions 206 in the memory 204 that are executable to perform operations. In some examples, the instructions 206 can include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processor 202 can execute instructions 206 to perform various operations. For example, the processor 202 can receive the message 222 from the message queue 220. The processor 202 can determine, based on the message 222 from the message queue 220, an additional IO operation predicted to be requested by the client 212 subsequent to the at least one request for the IO operation 262, as indicated by the additional IO operation indicator 264. The processor 202 may use a machine-learning model or another analysis technique to determine the additional IO operation. The processor 202 can send a notification 208 to a storage node 244 of the plurality of storage nodes 240 associated with the additional IO operation for prefetching data 226 of the additional IO operation prior to the client 212 requesting the additional IO operation. The storage node 244 can then retrieve the data 226 from a storage device and store the data 226 in a cache of the storage node 244 prior to the storage node 244 receiving a request for the additional IO operation. This can allow the data 226 to be rapidly retrieved from the cache for responding to a subsequent IO request for the data 226.

Figure 3:
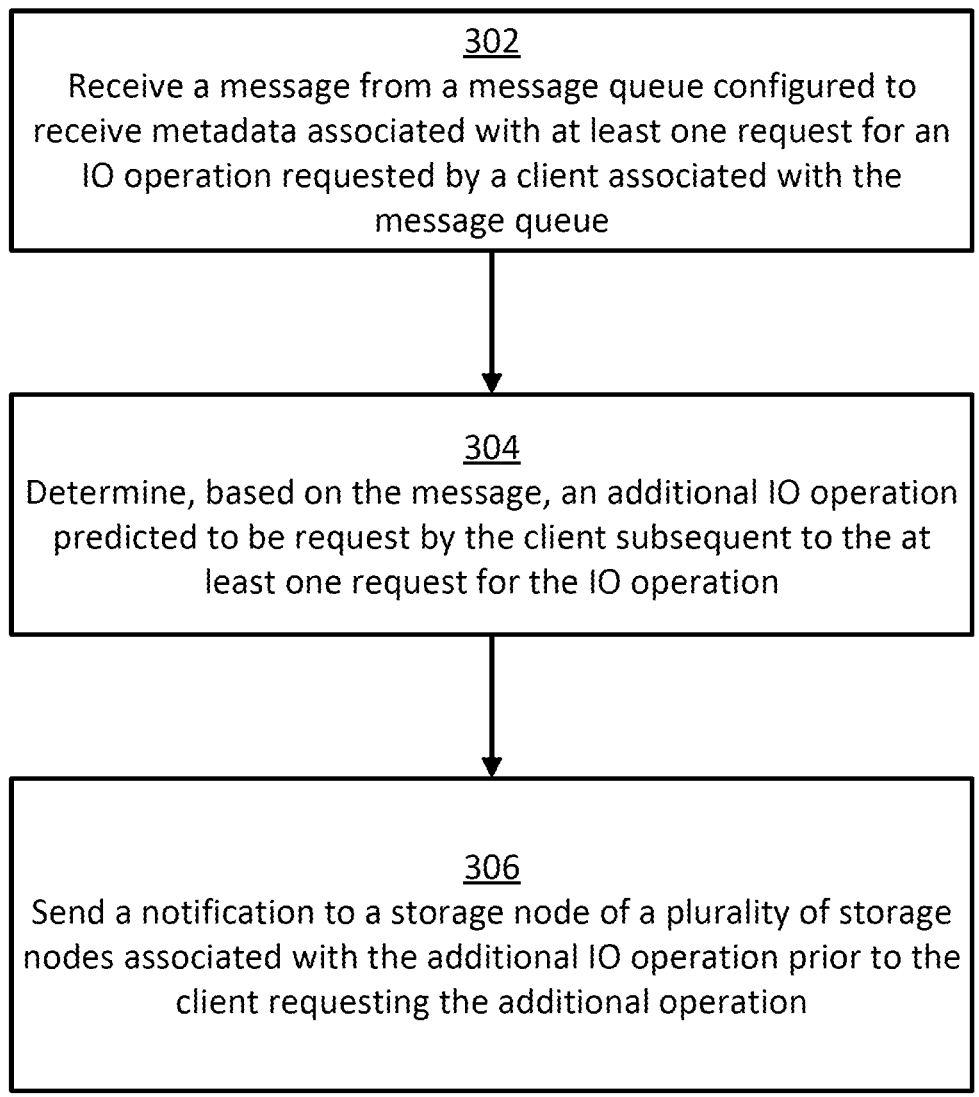
FIG. 3 is a flow chart of an example of a process for prefetching data in a distributed storage system according to some aspects of the present disclosure.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, a processor 202 receives a message 222 from a message queue 220. The message 222 includes metadata 224 associated with at least one request for an IO operation 262 sent from a client 212 associated with the message queue 220. The metadata 224 can be sent to the message queue 220 by the client 212 in parallel and asynchronous to the client 212 sending the at least one request for the IO operation 262 to a storage node of a plurality of storage nodes 240. Thus, prediction of subsequent requests for IO operations can be performed while the at least one request for the IO operation 262 is serviced.

In block 304, the processor 202 determines, based on the message 222 from the message queue 220, an additional IO operation 264 predicted to be requested by the client 212 subsequent to the at least one request for the IO operation 262. The metadata 224 may be input to a machine-learning model, or a different historical analysis may be performed, to determine the additional IO operation 264. Additionally, the processor 202 can determine a probability of the client 212 requesting the additional IO operation 264.

In block 306, the processor 202 sends a notification 208 to a storage node 244 of the plurality of storage nodes 240 associated with the additional IO operation 264. The notification 208 can indicate data 226 associated with additional IO operation 264 that is to be prefetched prior to the client 212 requesting the additional IO operation 264. Prefetching the data 226 can involve the storage node 244 retrieving the data from a storage device and storing the data 226 in a cache of the storage node 244 prior to the storage node 244 receiving a request for the additional IO operation 264. In some examples, the notification 208 may only be sent if the probability of the client 212 requesting the additional IO operation 264 is above a probability threshold. Prefetching data can allow for clients to receive data more quickly and reduce latency of the distributed storage system 200.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A method comprising:
receiving, by a computing device, a message from a message queue, the message comprising metadata associated with at least one request for an IO operation request sent by a client associated with the message queue;
determining, by the computing device and based on the message from the message queue, an additional IO operation predicted to be requested by the client subsequent to the at least one request for the IO operation; and
sending, by the computing device, a notification to a storage node associated with the additional IO operation for prefetching data of the additional IO operation prior to the client requesting the additional IO operation, the storage node being part of a plurality of storage nodes that each lack load information for other storage nodes of the plurality of storage nodes.

2. The method of claim 1, further comprising:
determining a probability of the client requesting the additional IO operation;
determining the probability exceeds a probability threshold; and
in response to the probability exceeding the probability threshold, sending the notification to the storage node associated with the additional IO operation.

3. The method of claim 1, further comprising:
determining a probability of the client requesting the additional IO operation;
determining the probability is less than the probability threshold; and
determining the notification is not to be sent to the storage node.

4. The method of claim 1, further comprising:
determining, by a management node, a number of clients associated with the message queue exceeds a threshold, each client of the clients being associated with a topic of the message queue that serves the client; and
generating a second message queue for servicing at least a portion of the clients.

5. The method of claim 1, further comprising:
determining, by the management node, that a load associated with the computing device is below a minimum limit; and
disabling the computing device from processing subsequent metadata of the at least one request for the IO operation.

6. The method of claim 1, further comprising:
in response to the storage node receiving the notification, retrieving the data of the additional IO operation from a storage device of the storage node; and
storing the data in a cache of the storage node prior to the storage node receiving a request for the additional IO operation from the client.

7. The method of claim 1, wherein determining the additional IO operation that is associated with the client comprises:
inputting the metadata associated with the at least one request for the IO operation to a machine-learning model; and
receiving the additional IO operation as output of the machine-learning model.

8. A distributed storage system comprising:
a client configured to send at least one request for an input/output (IO) operation;
a message queue associated with the client configured to receive a message comprising metadata associated with the at least one request for the IO operation;
a plurality of storage nodes, each storage node of the plurality of storage nodes lacking load information for other storage nodes of the plurality of storage nodes; and
a computing device associated with the message queue and comprising:
a processor; and
a memory storing a prediction engine as instructions that are executable by the processor for causing the processor to:
receive the message from the message queue;
determine, based on the message, an additional IO operation predicted to be requested by the client subsequent to the at least one request for the IO operation; and
send a notification to a storage node of the plurality of storage nodes associated with the additional IO operation for prefetching data of the additional IO operation prior to the client requesting the additional IO operation.

9. The distributed storage system of claim 8, wherein the memory further includes instructions that are executable by the processor for causing the processor to:
determine a probability of the client requesting the additional IO operation;
determine the probability exceeds a probability threshold; and
in response to the probability exceeding the probability threshold, send the notification to the storage node associated with the additional IO operation.

10. The distributed storage system of claim 8, wherein the memory further includes instructions that are executable by the processor for causing the processor to:
determine a probability of the client requesting the additional IO operation;
determine the probability is less than the probability threshold; and
determine the notification is not to be sent to the storage node.

11. The distributed storage system of claim 8, wherein the memory is a first memory, the processor is a first processor, and the instructions are first instructions, the distributed storage system further comprising:
a management node comprising:
second memory; and
a second processor including second instructions that are executable by the second processor for causing the second processor to:
determine a load associated with the computing device exceeds a load threshold; and
generate a second computing device for servicing at least a portion of the load.

12. The distributed storage system of claim 11, wherein the second memory further includes second instructions that are executable by the second processor for causing the second processor to:
determine, by the management node, the load associated with the computing device is below a minimum limit; and
disable the computing device from processing subsequent metadata of the at least one request for the IO operation.

13. The distributed storage system of claim 8, wherein the memory further includes instructions that are executable by the processor for causing the processor to:
in response to the storage node receiving the notification, retrieve the data of the additional IO operation from a storage device of the storage node; and
store the data in a cache of the storage node prior to the storage node receiving a request for the additional IO operation from the client.

14. The distributed storage system of claim 8, wherein the memory further includes instructions that are executable by the processor for causing the processor to determine the additional IO operation that is associated with the client by:
inputting the metadata associated with the at least one request for the IO operation to a machine-learning model; and
receiving the additional IO operation as output of the machine-learning model.

15. A non-transitory computer-readable medium comprising program code that is executable by a processor for causing the processor to:
receive, by a computing device, a message from a message queue, the message comprising metadata associated with at least one request for an IO operation request sent by a client associated with the message queue;
determining, by the computing device and based on the message, an additional IO operation predicted to be requested by the client subsequent to the at least one request for the IO operation; and
sending, by the computing device, a notification to a storage node associated with the additional IO operation for prefetching data of the additional IO operation prior to the client requesting the additional IO operation, the storage node being part of a plurality of storage nodes that each lack load information for other storage nodes of the plurality of storage nodes.

16. The non-transitory computer-readable medium of claim 15, further comprising program code that is executable by the processor for causing the processor to:
determine a probability of the client requesting the additional IO operation;
determine the probability exceeds a probability threshold; and
in response to the probability exceeding the probability threshold, send the notification to the storage node associated with the additional IO operation.

17. The non-transitory computer-readable medium of claim 15, further comprising program code that is executable by the processor for causing the processor to:
determine a probability of the client requesting the additional IO operation;
determine the probability is less than the probability threshold; and
determine the notification is not to be sent to the storage node.

18. The non-transitory computer-readable medium of claim 15, further comprising program code that is executable by the processor for causing the processor to:
determine, by a management node, a load associated with the computing device exceeds a load threshold; and
generate a second computing device for servicing at least a portion of the load.

19. The non-transitory computer-readable medium of claim 18, further comprising program code that is executable by the processor for causing the processor to:
determine, by the management node, the load associated with the computing device is below a minimum limit; and
disable the computing device from processing subsequent metadata of the at least one request for the IO operation.

20. The non-transitory computer-readable medium of claim 15, further comprising program code that is executable by the processor for causing the processor to:
in response to the storage node receiving the notification, retrieve the data of the additional IO operation from a storage device of the storage node; and
store the data in a cache of the storage node prior to the storage node receiving a request for the additional IO operation from the client.

* * * * *